(12) United States Patent
Xu et al.

(10) Patent No.: US 10,929,250 B2
(45) Date of Patent: Feb. 23, 2021

(54) METHOD AND SYSTEM FOR RELIABLY RESTORING VIRTUAL MACHINES

(71) Applicant: EMC IP Holding Company LLC, Hopkinton, MA (US)

(72) Inventors: Dening Xu, Chengdu (CN); Paloth Parambil Shahid, Bangalore (IN); Mohammed Samad, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 16/144,838

(22) Filed: Sep. 27, 2018

(65) Prior Publication Data

US 2020/0104218 A1    Apr. 2, 2020

(51) Int. Cl.
*G06F 9/455* (2018.01)
*G06F 11/14* (2006.01)

(52) U.S. Cl.
CPC ...... *G06F 11/1469* (2013.01); *G06F 9/45558* (2013.01); *G06F 11/1415* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 8,261,282 B1 * | 9/2012 | Ponnapur | G06F 9/505 | 718/1 |
| 8,966,318 B1 * | 2/2015 | Shah | G06F 11/3664 | 714/41 |
| 9,176,829 B2 * | 11/2015 | Jain | G06F 11/1484 | |
| 9,201,887 B1 * | 12/2015 | Earl | G06F 16/128 | |
| 9,280,428 B2 * | 3/2016 | Ripoll | G06F 11/2017 | |
| 9,336,103 B1 * | 5/2016 | Hasbe | G06F 11/203 | |
| 9,354,907 B1 * | 5/2016 | Teli | G06F 12/109 | |
| 9,354,908 B2 * | 5/2016 | Makin | G06F 9/45533 | |
| 9,396,071 B1 * | 7/2016 | Akanda | G06F 9/45533 | |
| 9,417,968 B2 * | 8/2016 | Dornemann | G06F 9/45558 | |
| 9,424,056 B1 * | 8/2016 | Bachu | G06F 11/1451 | |
| 9,641,389 B2 * | 5/2017 | Kothari | H04L 41/0846 | |
| 9,727,429 B1 * | 8/2017 | Moore | G06F 11/2094 | |

(Continued)

FOREIGN PATENT DOCUMENTS

EP    2645250 A3    2/2014

OTHER PUBLICATIONS

Yamato et al; "Fast and Reliable Restoration Method of Virtual Resources on OpenStack", IEEE Apr.-Jun. 2018; (Yamato_Jun2018.pdf; pp. 1-12) (Year: 2018).*

(Continued)

*Primary Examiner* — Hiren P Patel
(74) *Attorney, Agent, or Firm* — Chamberlain Hrdlicka

(57) ABSTRACT

A method and system for reliably restoring virtual machines. Specifically, the method and system disclosed herein enable virtual machine recovery, on a target computing system, indirectly through a connection to a central administration point. When the central administration point becomes unreachable, thereby interrupting the virtual machine recovery process, the method and system disclosed herein further facilitate directly connecting with the target computing system (bypassing the central administration point) in order to continue and complete the virtual machine recovery process.

18 Claims, 13 Drawing Sheets

(56) References Cited

U.S. PATENT DOCUMENTS

| | | | |
|---|---|---|---|
| 9,940,293 B1* | 4/2018 | Desai | G06F 13/426 |
| 10,114,706 B1* | 10/2018 | Chougala | G06F 11/1469 |
| 10,474,548 B2* | 11/2019 | Sanakkayala | G06F 11/203 |
| 10,642,790 B1* | 5/2020 | Brenner | G06F 16/188 |
| 2004/0172574 A1* | 9/2004 | Wing | G06F 11/2025 714/4.12 |
| 2007/0168478 A1* | 7/2007 | Crosbie | G06F 8/63 709/221 |
| 2009/0138752 A1* | 5/2009 | Graham | G06F 9/45558 714/4.1 |
| 2010/0115332 A1* | 5/2010 | Zheng | G06F 11/1466 714/6.2 |
| 2011/0209148 A1* | 8/2011 | Yamasaki | G06F 11/2005 718/1 |
| 2012/0180042 A1* | 7/2012 | Tsirkin | G06F 9/45558 718/1 |
| 2013/0007506 A1* | 1/2013 | Jain | G06F 11/1484 714/4.12 |
| 2014/0201737 A1* | 7/2014 | Mitkar | G06F 9/5077 718/1 |
| 2015/0113528 A1* | 4/2015 | Kim | G06F 9/452 718/1 |
| 2015/0113531 A1* | 4/2015 | Lv | G06F 9/4856 718/1 |
| 2016/0055064 A1 | 2/2016 | Gostev | |
| 2016/0077935 A1* | 3/2016 | Zheng | G06F 11/2028 714/4.12 |
| 2016/0335009 A1 | 11/2016 | Vijayan | |
| 2017/0230262 A1* | 8/2017 | Sreeramoju | H04L 43/10 |
| 2018/0189087 A1* | 7/2018 | Palermo | G06F 9/45558 |
| 2018/0309621 A1* | 10/2018 | Yuan | H04L 43/0817 |
| 2019/0163580 A1* | 5/2019 | Pandey | G06F 11/1469 |
| 2020/0026618 A1* | 1/2020 | Bansal | G06F 11/1469 |

OTHER PUBLICATIONS

Extended European Search Report issued in corresponding EP application No. 19198033.3, dated Feb. 11, 2020 (12 pages).

* cited by examiner

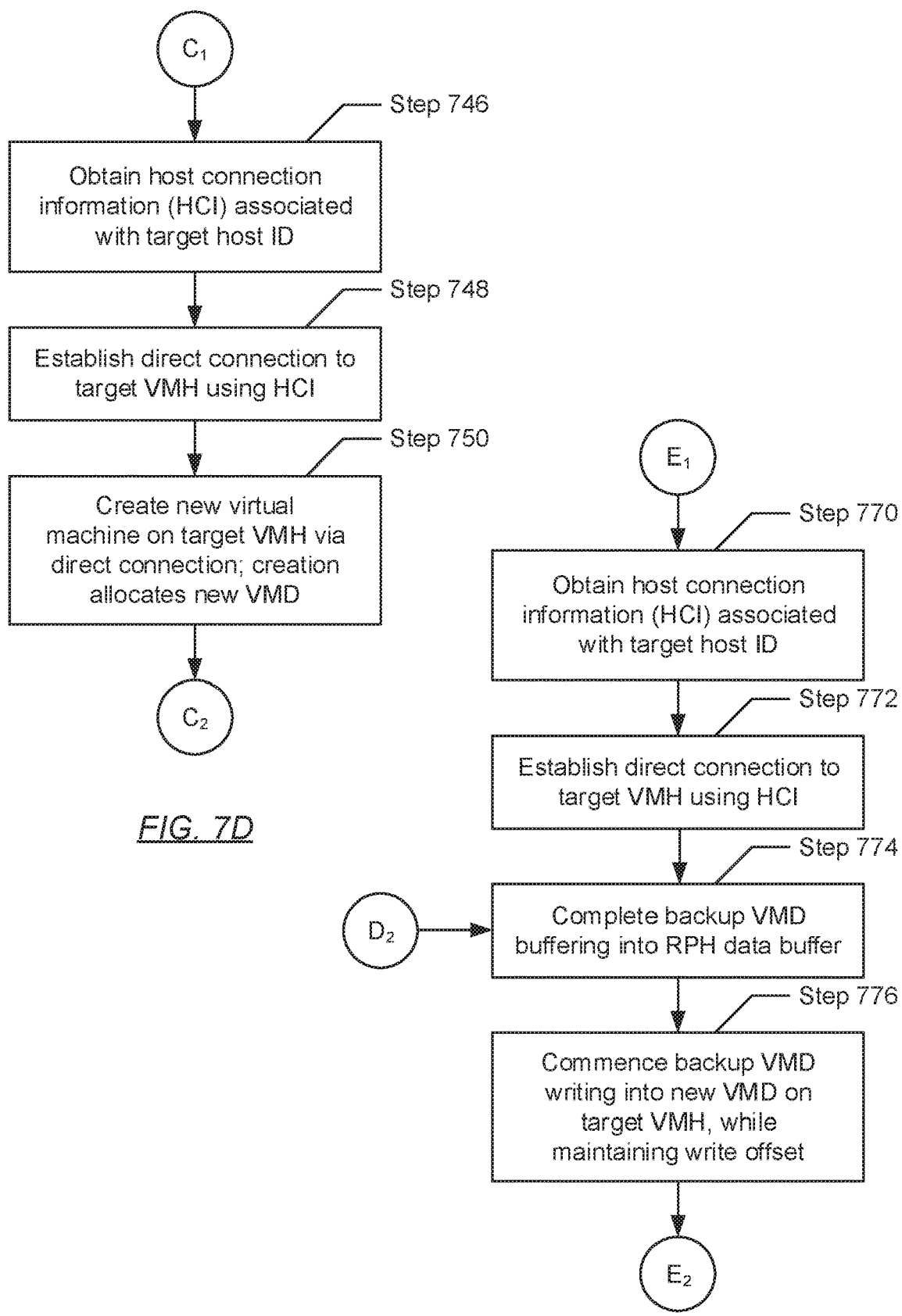

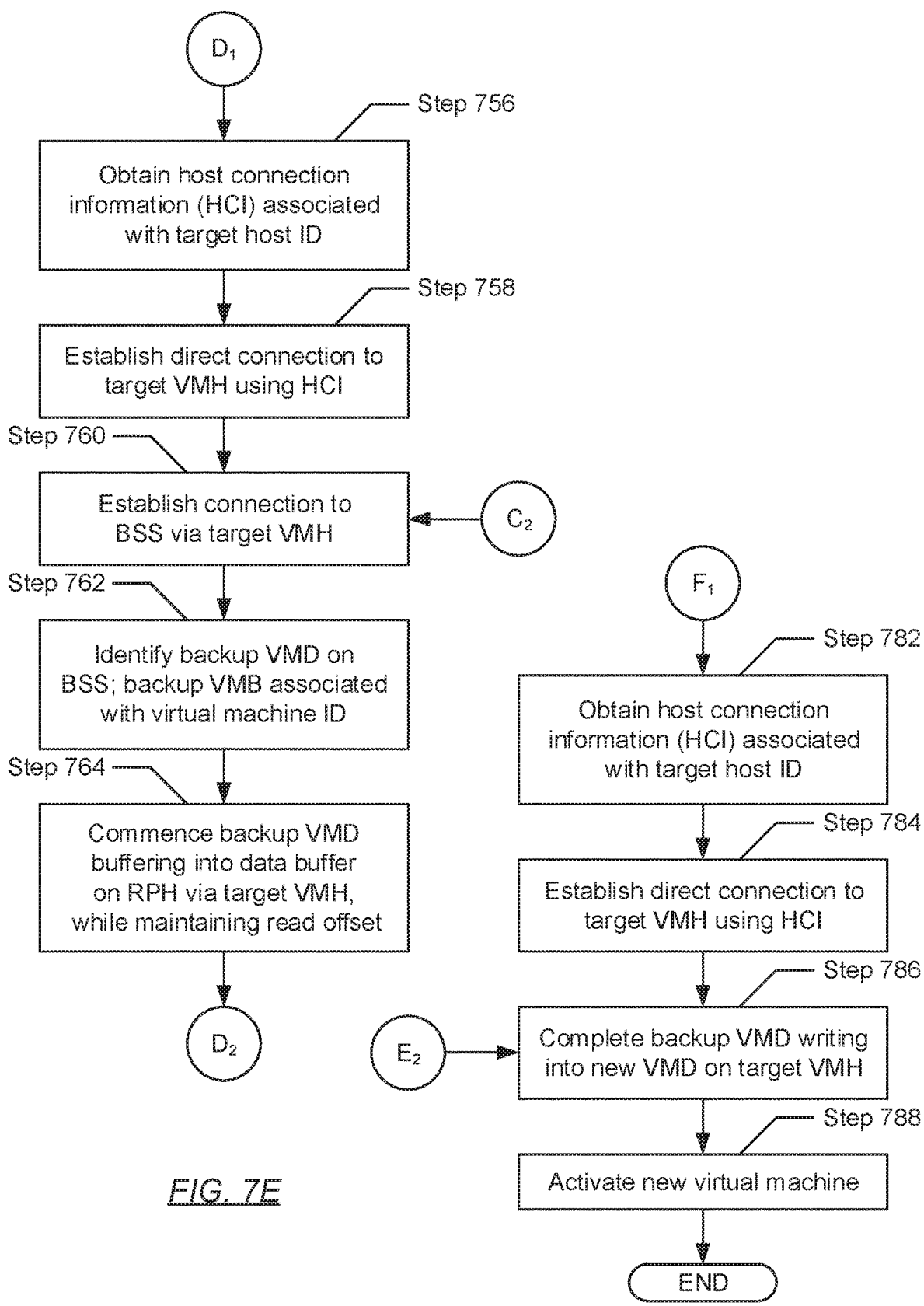

METHOD AND SYSTEM FOR RELIABLY RESTORING VIRTUAL MACHINES

BACKGROUND

Respective to virtual environments, central administration points typically manage the various virtual elements, such as virtual machines, which may be executing in those virtual environments.

BRIEF DESCRIPTION OF DRAWINGS

FIGS. 7A-7G show flowcharts describing a method for restoring a virtual machine in accordance with one or more embodiments of the invention.

DETAILED DESCRIPTION

Figure 1:
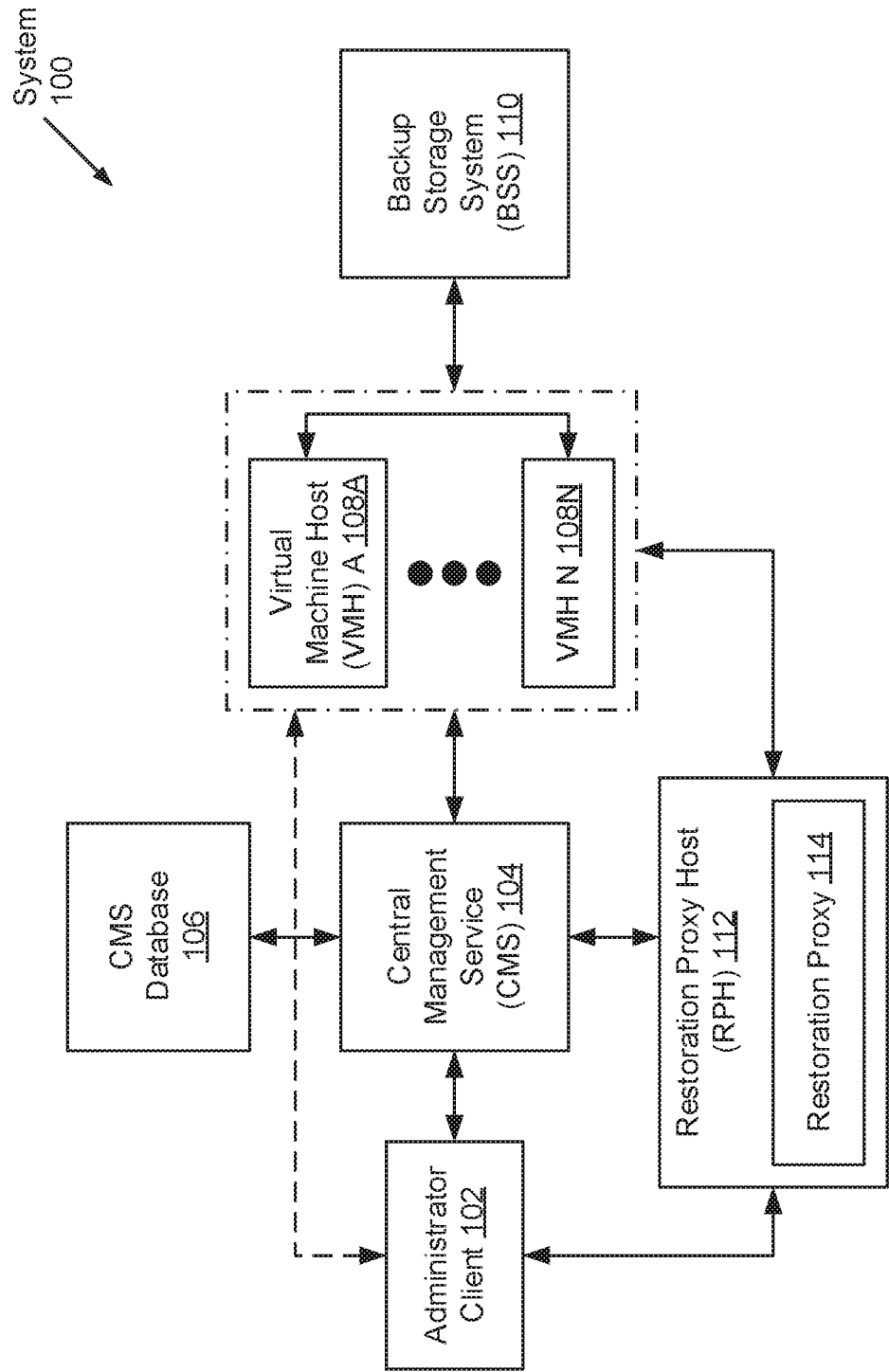
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for reliably restoring virtual machines. Specifically, one or more embodiments of the invention enable virtual machine recovery, on a target computing system, indirectly through a connection to a central administration point. When the central administration point becomes unreachable, thereby interrupting the virtual machine recovery process, embodiments of the invention further facilitate directly connecting with the target computing system (bypassing the central administration point) in order to continue and complete the virtual machine recovery process.

Existing solutions directed to virtual machine restoration rely heavily on the established connection to a central administration point, which may manage the virtual environment within a datacenter or cloud computing environment. Through the central administration point, existing solutions gain access to and interact with managed virtual machines, including coordinating their recovery in response to hardware failure (i.e., occurring on the physical computing systems whereon the managed virtual machines may have executed) or logical failure (i.e., representative of abnormal behavior or data corruption associated with the managed virtual machines themselves). Accordingly, the established connection to the central administration point can become a fatal liability and weakness respective to these existing solutions.

Particularly, when the central administration point becomes unreachable or unavailable for various reasons (e.g., physical severance of the connection, networking issues, timeouts, etc.), existing solutions are ill-equipped to mitigate the loss of the central administration point, which holds a significant role in facilitating any virtual machine restoration processes. Consequently, any already-underway restoration processes, commenced through the central administration point, are halted, thereby forcing existing solutions to restart these restoration processes (from the beginning) once a connection is re-established with the central administration point. Embodiments of the invention address one or more of these faults in existing solutions by tracking the progression of a given virtual machine restoration process. Further, when the central administration point becomes unreachable/unavailable, embodiments of the invention bypass the central administration point and communicate directly with the virtual machine host to resume and complete the restoration process from a tracked breakpoint. Embodiments of the invention, thus, alleviate heavy reliance on the established connection to the central administration point and, also, prevent the existing requirement to restart already-underway restoration processes, which may be halted through the unreachability or unavailability of the central administration point at any given time.

FIG. 1 shows a system in accordance with one or more embodiments of the invention. The system (100) may include an administrator client (102), a central management service (CMS) (104), a CMS database (106), one or more virtual machine hosts (VMH) (108A-108N), a backup storage system (BSS) (110), and a restoration proxy host (RPH) (112). Each of these components is described below.

In one embodiment of the invention, the above-mentioned components may be directly or indirectly connected to one another through a network (not shown) (e.g., a local area network (LAN), a wide area network (WAN) such as the Internet, a mobile network, or any other network). The network may be implemented using any combination of wired and/or wireless connections. In embodiments in which the above-mentioned components are indirectly connected, there may be other networking components or systems (e.g., switches, routers, gateways, etc.) that facilitate communications, information exchange, and/or resource sharing. Further, the above-mentioned components may communicate with one another using any combination of wired and/or wireless communication protocols.

In one embodiment of the invention, the administrator client (102) may be any physical computing system operated by an administrator of one or more components of the system (100). An administrator may be at least one individual or an entity whom may be responsible for overseeing operations and maintenance pertinent to one or more components of the system (100). Further, the administrator client (102) may include functionality to: submit restoration requests, to a restoration proxy (described below), which may be directed to restoring virtual machines residing on the one or more VMHs (108A-108N); and serve as a console to operate the various virtual machines executing on the one or more VMHs (108A-108N). One of ordinary skill will appreciate that the administrator client (102) may perform other functionalities without departing from the scope of the invention. Examples of the administrator client (102) may include, but are not limited to, a desktop computer, a laptop computer, a tablet computer, a server, a mainframe, a smartphone, or any other computing system similar to the exemplary computing system shown in FIG. 8.

In one embodiment of the invention, the CMS (104) may represent a central administration point for the one or more VMHs (108A-108N) and the various virtual machines (not shown) that may be executing thereon. The CMS (104) may be implemented on one or more servers (not shown). Each server may be a physical server (i.e., within a datacenter) or a virtual server (i.e., residing in a cloud computing environment). In one embodiment of the invention, the CMS (104) may be implemented on one or more computing systems similar to the exemplary computing system shown in FIG. 8. Further, the CMS (104) may include functionality to: issue instructions to the one or more VMHs (108A-108N) and any of the various virtual machines that may be executing thereon; serve as an information transfer relay between any VMH (108A-108N) and the restoration proxy (described below) and/or the administration client (102); and interface with the CMS database (106) to consolidate and retrieve critical information pertinent to the virtual environment (e.g., the one or more VMHs (108A-108N) and the various virtual machines executing thereon). Towards supporting the aforementioned virtual environment, the CMS (104) may include further functionality to unify computing resources from individual VMHs (108A-108N) such that the computing resources may be shared amongst the various virtual machines executing throughout the system (100). One of ordinary skill will appreciate that the CMS (104) may perform other functionalities without departing from the scope of the invention. The CMS (104) is described in further detail below with respect to FIG. 2.

In one embodiment of the invention, the CMS database (106) may be a dedicated storage system for the CMS (104). The CMS database (106) may be implemented on one or more servers (not shown). Each server may be a physical server (i.e., within a datacenter) or a virtual server (i.e., residing in a cloud computing environment). In one embodiment of the invention, the CMS database (106) may be implemented on one or more computing systems similar to the exemplary computing system shown in FIG. 8. Further, the CMS database (106) may include functionality to store various information (described below) pertinent to the above-mentioned virtual environment managed by the CMS (104). The CMS database (106) is described in further detail below with respect to FIG. 2.

In one embodiment of the invention, each VMH (108A-108N) may be any physical computing system on which one or more virtual machines (not shown) may be executing. Further, each VMH (108A-108N) may be any physical computing system used to execute various applications. These applications may, for example, require large-scale and complex data processing; and may service multiple users concurrently. Moreover, each VMH (108A-108N) may be programmed to provide and manage the allocation of computing resources (e.g., computer processors, memory, persistent and non-persistent storage, network bandwidth, etc.) towards the execution of various processes (or tasks) (e.g., virtual machines) that may be instantiated thereon. One of ordinary skill will appreciate that each VMH (108A-108N) may perform other functionalities without departing from the scope of the invention. Examples of a VMH (108A-108N) may include, but are not limited to, a desktop computer, a laptop computer, a tablet computer, a server, a mainframe, a smartphone, or any other computing system similar to the exemplary computing system shown in FIG. 8. VMHs (108A-108N) are described in further detail below with respect to FIG. 3.

In one embodiment of the invention, the BSS (110) may refer to a data backup, archiving, and/or disaster recovery storage system. The BSS (110) may be implemented using one or more servers (not shown). Each server may be a physical server (i.e., within a datacenter) or a virtual server (i.e., residing in a cloud computing environment). In one embodiment of the invention, the BSS (110) may be implemented using one or more computing systems similar to the exemplary computing system shown in FIG. 8. Further, the BSS (110) may include functionality to store virtual machine state (described below) respective to one or more virtual machines (not shown) for various recovery points-in-time. The BSS (110) is described in further detail below with respect to FIG. 4.

In one embodiment of the invention, the RPH (112) may be any physical computing system whereon a restoration proxy (114) may execute. The restoration proxy (114) may be a computer program or process (i.e., an instance of a computer program) tasked with fulfilling virtual machine recovery in accordance with one or more embodiments of the invention (see e.g., FIGS. 7A-7G). Further, the RPH (112) may include functionality to provide and manage the allocation of computer resources (e.g., computer processors, memory, persistent and non-persistent storage, network bandwidth, etc.) towards supporting the restoration proxy (114). In one embodiment of the invention, the RPH (112) may be one of the VMHs (108A-108N) overseen by the CMS (104). One of ordinary skill will appreciate that the RPH (112) may perform other functionalities without departing from the scope of the invention. Examples of the RPH (112) may include, but are not limited to, a desktop computer, a laptop computer, a tablet computer, a server, a mainframe, a smartphone, or any other computing system similar to the exemplary computing system shown in FIG. 8. The RPH (112) is described in further detail below with respect to FIG. 5.

While FIG. 1A shows a configuration of components, other system configurations may be used without departing from the scope of the invention.

Figure 2:
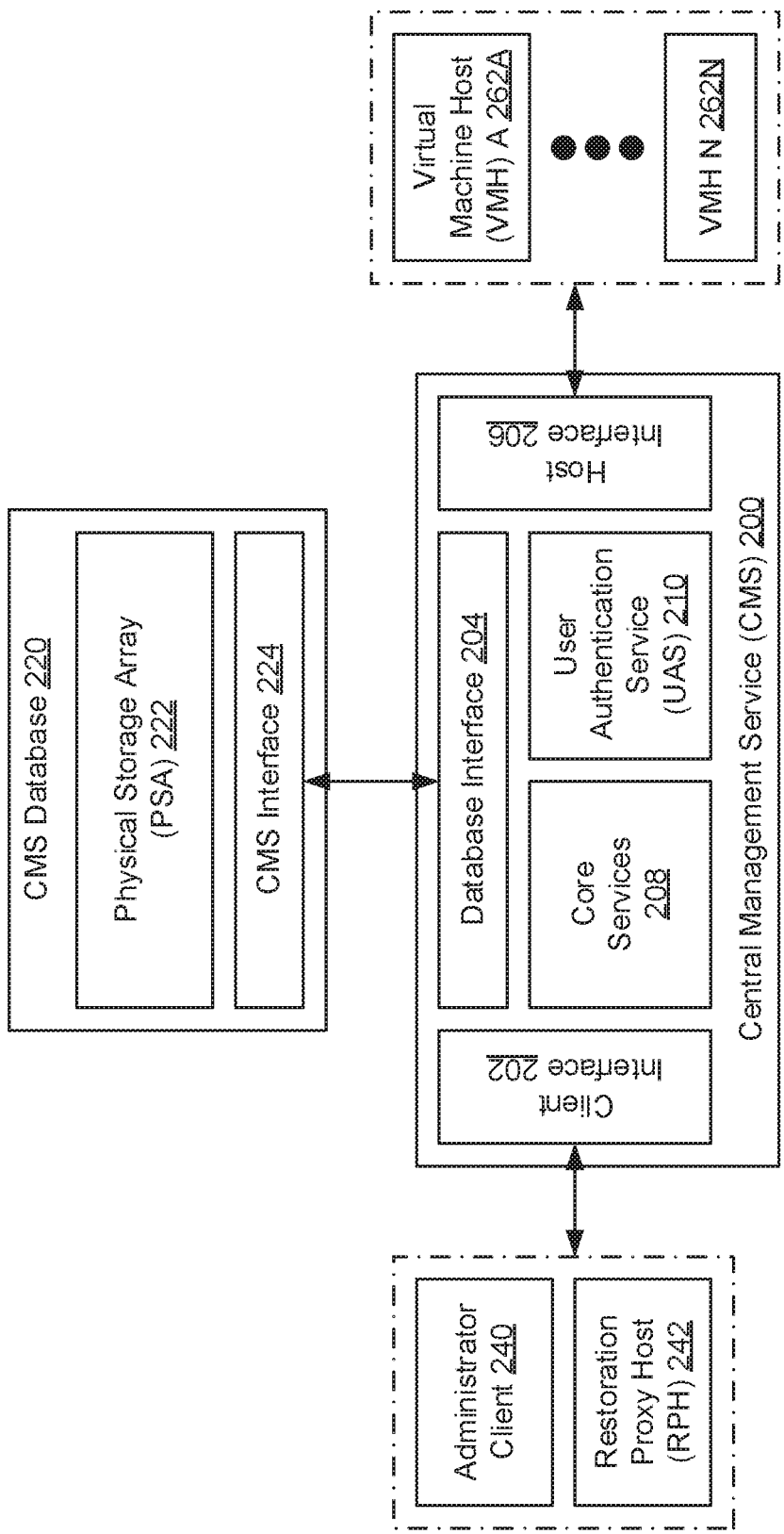
FIG. 2 shows a central management service and database in accordance with one or more embodiments of the invention.

FIG. 2 shows a central management service (CMS) and CMS database in accordance with one or more embodiments of the invention. The CMS (200) may include a client interface (202), a database interface (204), a host interface (206), one or more core services (208), and a user authentication service (UAS) (210). Meanwhile, the CMS database (220) may include a physical storage array (PSA) (222) and a CMS interface (224). Each of these subcomponents is described below.

In one embodiment of the invention, the client interface (202) of the CMS (200) may be a hardware and/or software implemented construct that employs a set of subroutine definitions, protocols, and/or tools for enabling communications between the CMS (200) and the administrator client (240) or the restoration proxy host (RPH) (242). By way of an example, the client interface (202) may be a web application programming interface (API) that may be accessed through an assigned web address (e.g., a uniform resource locator (URL)) and a WAN (e.g., Internet) connection.

In one embodiment of the invention, the database interface (204) of the CMS (200) may be a hardware and/or software implemented construct that employs a set of subroutine definitions, protocols, and/or tools for enabling communications between the CMS (200) and the CMS database (220). By way of an example, the database interface (204) may be a web API that may be accessed through an assigned web address (e.g., a URL) and a WAN (e.g., Internet) connection.

In one embodiment of the invention, the host interface (206) of the CMS (200) may be a hardware and/or software implemented construct that employs a set of subroutine definitions, protocols, and/or tools for enabling communications between the CMS (200) and one or more virtual machine hosts (VMHs) (262A-262N). By way of an example, the host interface (206) may be a web API that may be accessed through an assigned web address (e.g., a URL) and a WAN (e.g., Internet) connection.

In one embodiment of the invention, each core service (208) of the CMS (200) may represent a basic management service for the virtual environment (e.g., the one or more VMHs (262A-262N) and the various virtual machines (not shown) that may be executing thereon). Further, each core service (208) may be implemented through one or more computer programs or processes (i.e., instances of a computer program), which may be executing on the underlying hardware of the CMS (200). The core services (208) of the CMS (200) may be directed to, for example, virtual machine provisioning (i.e., which guides and automates the provisioning of virtual machines and their resources), host and virtual machine configuration (i.e., which manages the configuration of VMHs (262A-262N) and their respective virtual machines), resources and virtual machine inventory management (i.e., which organizes virtual machines and resources, and facilitates their management), statics and logging (i.e., which records and reports on the performance and resource use statistics of the VMHs (262A-262N) and their respective virtual machines), alarms and event management (i.e., which tracks and warns users on potential resource overuse or event conditions), task scheduling (i.e., which schedules pertinent actions to occur at given times), and consolidation (i.e., which analyzes the capacity and use of the various computing resources shared throughout the virtual environment).

In one embodiment of the invention, the UAS (210) of the CMS (200) may represent an authentication service for the virtual environment (e.g., the one or more VMHs (262A-262N) and the various virtual machines (not shown) that may be executing thereon). To that extent, the UAS (210) may include functionality to: facilitate the authentication of users and/or entities (e.g., the restoration proxy) attempting to connect with, gain access to, and interact with the CMS (200); and manage varying levels of access to the CMS (200) for different classes of users and/or entities. One of ordinary skill will appreciate that the UAS (210) may perform other functionalities without departing from the scope of the invention.

In one embodiment of the invention, the PSA (222) of the CMS database (220) may represent a collection of one or more physical storage devices and/or media on which various forms of information—pertinent to the virtual environment—may be consolidated. The one or more physical storage devices and/or media may or may not be of the same type, and may or may not be co-located at the same physical site. Further, the information consolidated in the PSA (222) may be arranged by way of any storage mechanism (e.g., a filesystem, a collection of tables or records, etc.). In one embodiment of the invention, the PSA (222) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, in one embodiment of the invention, information that may be stored on the PSA (222) may include, but is not limited to, alarm and event triggering information, VMH (262A-262N) information, virtual machine information, performance statistics, resource pools, custom attributes, etc.

In one embodiment of the invention, the CMS interface (224) of the CMS database (220) may be a hardware and/or software implemented construct that employs a set of subroutine definitions, protocols, and/or tools for enabling communications between the CMS database (220) and the CMS (200). By way of an example, the CMS interface (224) may be a web API that may be accessed through an assigned web address (e.g., a URL) and a WAN (e.g., Internet) connection.

Figure 3:
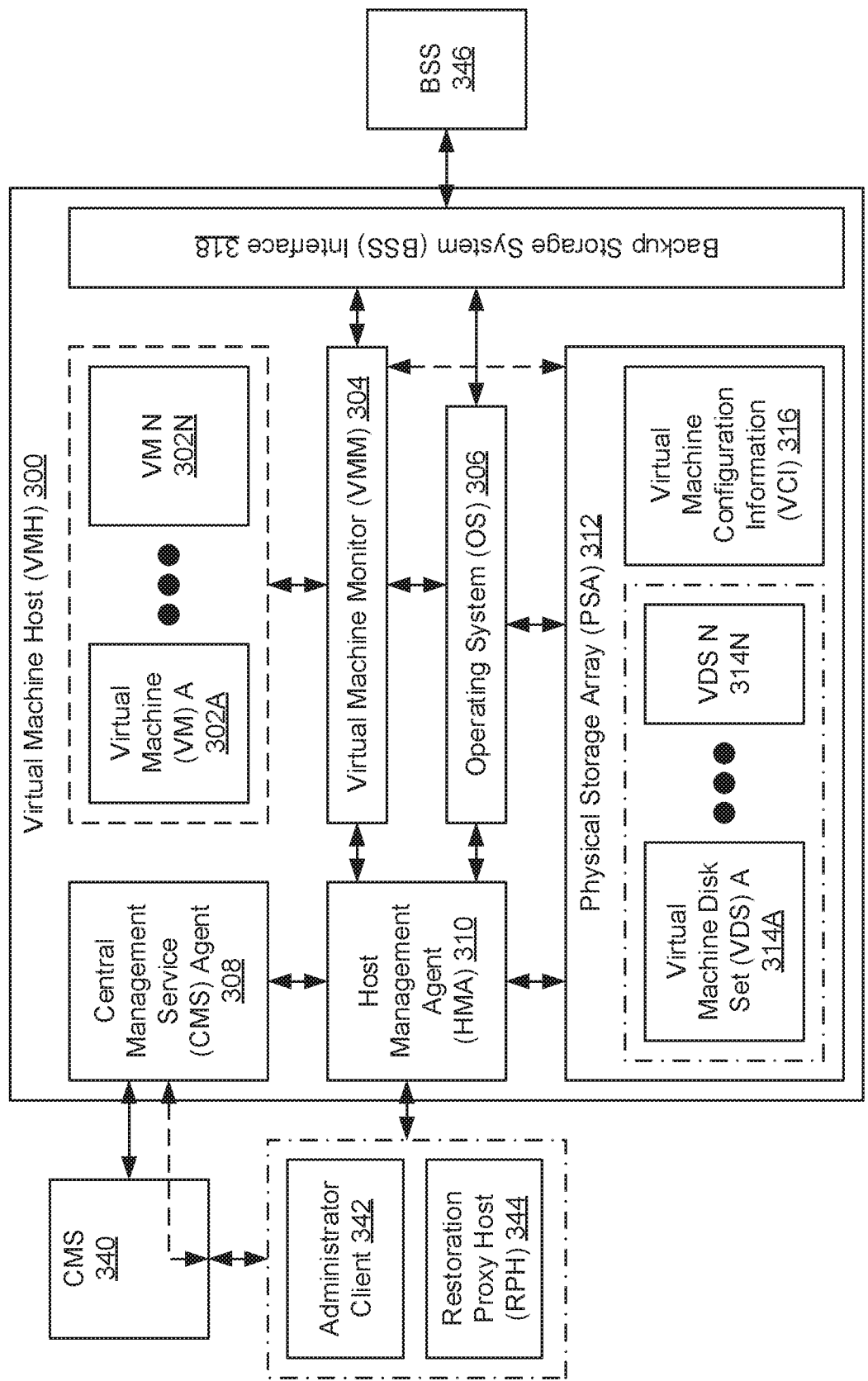
FIG. 3 shows a virtual machine host in accordance with one or more embodiments of the invention.

FIG. 3 shows a virtual machine host (VMH) in accordance with one or more embodiments of the invention. The VMH (300) may include one or more virtual machines (VMs) (302A-302N), a virtual machine monitor (VMM) (304), an operating system (OS) (306), a central management service (CMS) agent (308), a host management agent (HMA) (310), a physical storage array (PSA) (312), and a backup storage system (BSS) interface (318). Each of these subcomponents is described below.

In one embodiment of the invention, each VM (302A-302N) may be a computer program that executes on the underlying hardware of the VMH (300). Further, each VM (302A-302N) may represent a computer program that emulates a physical computing system and, thus, provides a self-contained execution environment on which one or more other computer programs (e.g., guest OSs and/or applications) may execute. In addition, each VM (302A-302N) may access the underlying VMH (300) hardware and interact with other above-mentioned VMH (300) subcomponents using an abstraction layer—i.e., the VMM (304) (described below). Moreover, each VM (302A-302N) may include functionality to submit disk input-output (IO) operations directed to reading data from and writing data to a corresponding virtual machine disk set (VDS) (314A-314N) (described below) residing on the PSA (312).

In one embodiment of the invention, the VMM (304) may be a computer program or process (i.e., an instance of a computer program) that executes on the underlying hardware of the VMH (300). Specifically, the VMM (304) may be a computer program or process tasked with the management of the various VMs (302A-302N). To that extent, the VMM (304) may include functionality to: create and delete VMs (302A-302N); allocate and deallocate VMH (300) resources to support the execution of the VMs (302A-302N); and enable, as well as manage, intra-process communication between the various VMs (302A-302N) and other above-mentioned VMH (300) subcomponents. One of ordinary skill will appreciate that the VMM (304) may perform other functionalities without departing from the scope of the invention.

In one embodiment of the invention, the OS (306) may be a computer program that executes on the underlying hardware of the VMH (300). Specifically, the OS (306) may be a computer program tasked with managing the underlying VMH (300) hardware and other logical/software components that may be executing on the VMH (300). Further, the OS (306) may include functionality to, for example, support fundamental VMH (300) functions; schedule tasks; allocate VMH (300) resources; execute other computer programs and/or processes; and facilitate inter-process communications between various VMH (300) subcomponents. One of ordinary skill will appreciate that the OS (306) may perform other functionalities without departing from the scope of the invention.

In one embodiment of the invention, the CMS agent (308) may be a computer program or process (i.e., an instance of a computer program) that executes on the underlying hardware of the VMH (300). Specifically, the CMS agent (308) may be a computer program or process tasked with mediating communications between the CMS (340) and the HMA (310). To that extent, the CMS agent (308) may include functionality to: receive instructions from the CMS (340); relay received instructions to the HMA (310); receive instruction results from the HMA (310); and submit received instruction results to the CMS (340). One of ordinary skill will appreciate that the CMS agent (308) may perform other functionalities without departing from the scope of the invention.

In one embodiment of the invention, the HMA (310) may be a computer program or process (i.e., an instance of a computer program) that executes on the underlying hardware of the VMH (300). Specifically, the HMA (310) may be a computer program or process tasked with managing most operations on the VMH (300) pertaining to the virtual environment. To that extent, the HMA (310) may include functionality to: receive instructions, originating from the administrator client (342) and/or restoration proxy host (RPH) (344) via the CMS (340) and the CMS agent (308); execute received instructions, thereby manipulating one or more VMs (302A-302N) via the VMM (304); obtain instruction results based on executing the received instructions; and providing the instruction results to the administrator client (342) and/or RPH (344) via the CMS agent (308) and the CMS (340). In one embodiment of the invention, the HMA (310) may include further functionality to receive instructions directly from and administrator client (342) and/or the RPH (344) should the CMS (340) be disabled. One of ordinary skill will appreciate that the HMA (310) may perform other functionalities without departing from the scope of the invention.

In one embodiment of the invention, the PSA (312) may represent a collection of one or more physical storage devices and/or media on which various forms of information—pertinent to one or more VMs (302A-302N)—may be consolidated. The one or more physical storage devices and/or media may or may not be of the same type. Further, the information consolidated in the PSA (312) may be arranged by way of any storage mechanism (e.g., a filesystem, a collection of tables or records, etc.). In one embodiment of the invention, the PSA (312) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the PSA (312) may store one or more virtual machine disk sets (VDSs) (314A-314N). Each VDS (314A-314N) may represent a collection of one or more virtual machine disks (not shown), which retain snapshots of state pertaining to a corresponding VM (302A-302N) at various recovery points-in-time. That is, the cardinality of VDSs (314A-314N) matches the cardinality of VMs (302A-302N), thus ensuring a one-to-one mapping between VDSs (314A-314N) and VMs (302A-302N). Further, each virtual machine disk (not shown) of a VDS (314A-314N) may be a logical container, a data object, or a data structure that stores virtual machine state and associated metadata, which may be necessary for a respective VM (302A-302N) to operate. Moreover, each virtual machine disk (not shown) and/or VDS (314A-314N) may span across one or more physical storage devices and/or media that implement, at least in part, the PSA (312).

In one embodiment of the invention, the PSA (312) may further store virtual machine configuration information (VCI) (316) for each VM (302A-302N) that may be executing on the VMH (300). VCI (316) for a given VM (302A-302N) may specify various settings pertinent to the operation of the given VM (302A-302N). These settings may include, but are not limited to, hardware configuration settings (e.g., computing resources such as processors, memory, storage, network bandwidth, etc., which support a given VM (302A-302N)), power management settings, and optional tools. One of ordinary skill will appreciate that VCI (316) may specify additional or alternative information without departing from the scope of the invention.

In one embodiment of the invention, the BSS interface (318) may be a hardware and/or software implemented construct that employs a set of subroutine definitions, protocols, and/or tools for enabling communications between the VMH (300) and the BSS (346). By way of an example, the BSS interface (318) may be a web application programming interface (API) that may be accessed through an assigned web address (e.g., a uniform resource locator (URL)) and a WAN (e.g., Internet) connection.

In one embodiment of the invention, the restoration proxy (see e.g., FIG. 1) may alternative reside on one or more VMHs (300) (i.e., rather than a restoration proxy host (RPH)). In such an embodiment, the VMH(s) (300) whereon the restoration proxy may be executing, may further include a data buffer (not shown) (described below) allocated within the PSA (312). In such an embodiment, the VMH(s) (300) whereon the restoration proxy may be executing, may also include a host interface (not shown) to enable communications between the restoration proxy and other VMHs (300). Moreover, the PSA (312) may additional store primary connection information (PCI) for connecting to the CMS (542) and host connection information (HCI) for connecting to the various other VMHs (300) (described below).

Figure 4:
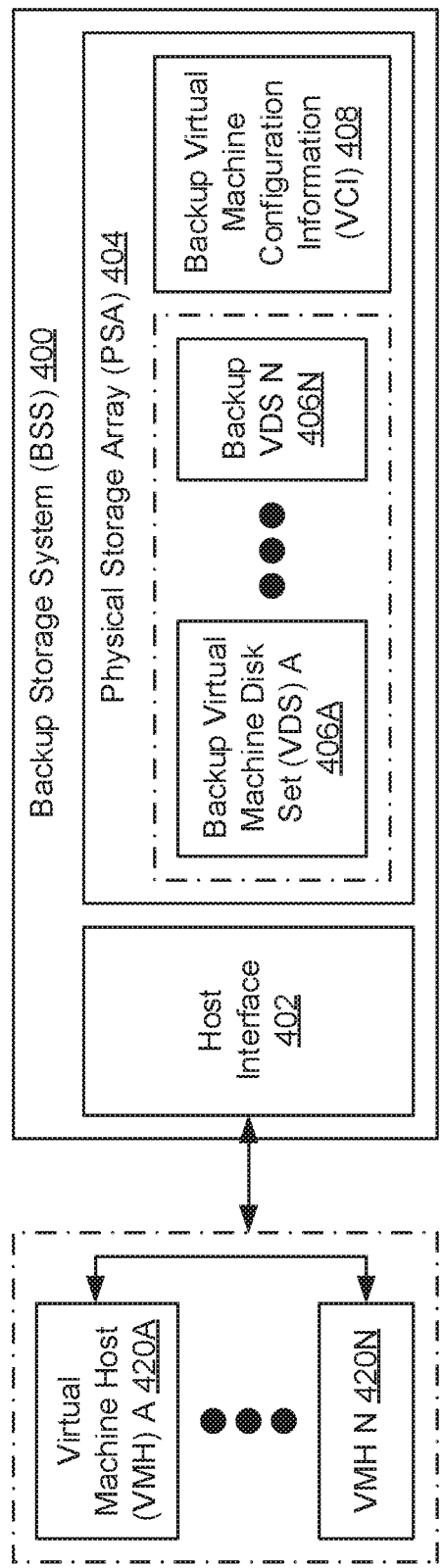
FIG. 4 shows a backup storage system in accordance with one or more embodiments of the invention.

FIG. 4 shows a backup storage system (BSS) in accordance with one or more embodiments of the invention. The BSS (400) may include a host interface (402) and a physical storage array (PSA) (404). Each of these subcomponents is described below.

In one embodiment of the invention, the host interface (402) may be a hardware and/or software implemented construct that employs a set of subroutine definitions, protocols, and/or tools for enabling communications between the BSS (400) and the various virtual machine hosts (VMHs) (420A-420N) that may use the BSS (400) for data backup, archiving, and/or disaster recovery purposes. By way of an example, the host interface (402) may be a web application programming interface (API) that may be accessed through an assigned web address (e.g., a uniform resource locator (URL)) and a WAN (e.g., Internet) connection.

In one embodiment of the invention, the PSA (404) may represent a collection of one or more physical storage devices and/or media on which various forms of information—pertinent to one or more VMs (302A-302N)—may be consolidated. The one or more physical storage devices and/or media may or may not be of the same type. Further, the information consolidated in the PSA (312) may be arranged by way of any storage mechanism (e.g., a filesystem, a collection of tables or records, etc.). In one embodiment of the invention, the PSA (312) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the PSA (404) may store one or more backup virtual machine disk sets (VDSs) (406A-406N). Each backup VDS (406A-406N) may be a copy of a corresponding VDS (not shown) that resides on one or more VMHs (420A-420N) (see e.g., FIG. 3). Subsequently, each backup VDS (406A-406N) may represent a collection of one or more replica virtual machine disks, which retain copies of snapshots of state associated with a corresponding virtual machine (not shown) at various recovery points-in-time. Further, each replica virtual machine disk (not shown) of a backup VDS (406A-406N) may be a logical container, a data object, or a data structure that stores copies of virtual machine state. Moreover, each replica virtual machine disk (not shown) and/or backup VDS (406A-406N) may span across one or more physical storage devices and/or media that implement, at least in part, the BSS (400).

In one embodiment of the invention, the PSA (404) may further store backup virtual machine configuration information (VCI) (408) for each virtual machine that may be executing on the one or more VMHs (420A-420N). Each backup VCI (408) may be a copy of a corresponding VCI (not shown) that resides on one or more VMHs (420A-420N) (see e.g., FIG. 3). Subsequently, the backup VCI (408) for a given virtual machine may represent a copy of various settings pertinent to the operation of the given virtual machine. These settings may include, but are not limited to, hardware configuration settings (e.g., computing resources such as processors, memory, storage, network bandwidth, etc., which support a given virtual machine), power management settings, and optional tools. One of ordinary skill will appreciate that backup VCI (408) may specify additional or alternative information without departing from the scope of the invention.

Figure 5:
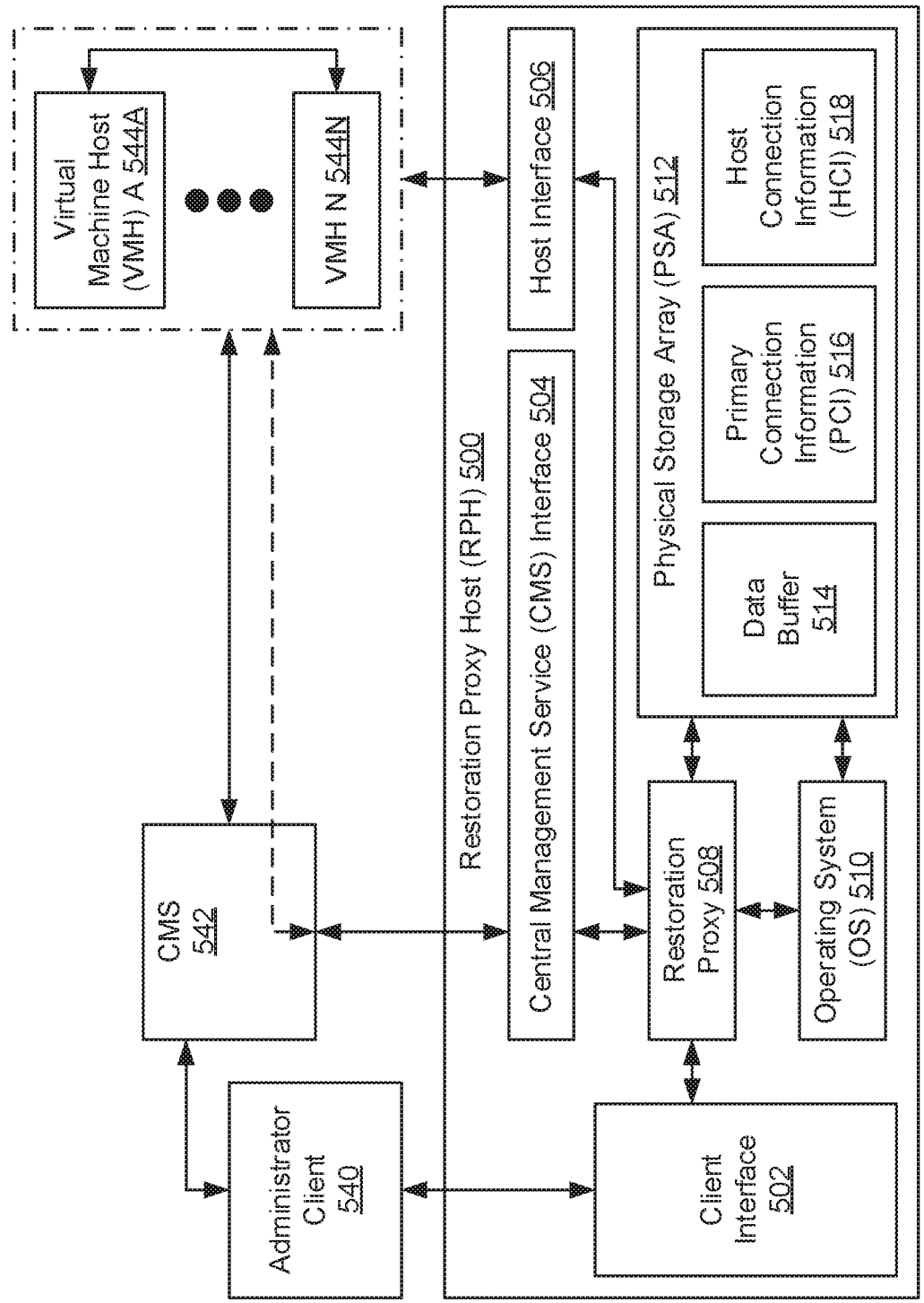
FIG. 5 shows a restoration proxy host in accordance with one or more embodiments of the invention.

FIG. 5 shows a restoration proxy host (RPH) in accordance with one or more embodiments of the invention. The RPH (500) may include a client interface (502), a central management service (CMS) interface (504), a host interface (506), a restoration proxy (508), and operating system (OS), and a physical storage array (PSA) (512). Each of these subcomponents is described below.

In one embodiment of the invention, the client interface (502) may be a hardware and/or software implemented construct that employs a set of subroutine definitions, protocols, and/or tools for enabling communications between the RPH (500) and the administrator client (540). By way of an example, the client interface (502) may be a web application programming interface (API) that may be accessed through an assigned web address (e.g., a uniform resource locator (URL)) and a WAN (e.g., Internet) connection.

In one embodiment of the invention, the CMS interface (504) may be a hardware and/or software implemented construct that employs a set of subroutine definitions, protocols, and/or tools for enabling communications between the RPH (500) and the CMS (542). By way of an example, the CMS interface (504) may be a web API that may be accessed through an assigned web address (e.g., a URL) and a WAN (e.g., Internet) connection.

In one embodiment of the invention, the host interface (506) may be a hardware and/or software implemented construct that employs a set of subroutine definitions, protocols, and/or tools for enabling communications between the RPH (500) and one or more virtual machine hosts (VMHs) (544A-544N). The RPH (500) may communicate directly with the various VMHs (544A-544N), versus indirectly through the CMS (542), when the connection to the CMS (542), established through the CMS interface (504), becomes disabled or otherwise unavailable. By way of an example, the host interface (506) may be a web application programming interface (API) that may be accessed through an assigned web address (e.g., a uniform resource locator (URL)) and a WAN (e.g., Internet) connection.

In one embodiment of the invention, the restoration proxy (508) may be a computer program or process (i.e., an instance of a computer program) that executes on the underlying hardware of the RPH (500). Specifically, the restoration proxy (508) may be a computer program or process tasked with fulfilling virtual machine recovery in accordance with one or more embodiments of the invention (see e.g., FIGS. 7A-7G). To that extent, the restoration proxy (508) may include functionality to: receive restoration requests from the administrator client (540) via the client interface (502); and process received restoration requests to restore one or more virtual machines (not shown) at designated target VMHs (544A-544N) either through indirect interactions with target VMHs (544A-544N) via the CMS (542) or through direct interactions with target VMHs (544A-544N).

In one embodiment of the invention, the OS (510) may be a computer program that executes on the underlying hardware of the RPH (500). Specifically, the OS (510) may be a computer program tasked with managing the underlying RPH (500) hardware and other logical/software components that may be executing on the RPH (500). Further, the OS (510) may include functionality to, for example, support fundamental RPH (500) functions; schedule tasks; allocate RPH (500) resources; execute other computer programs and/or processes; and facilitate inter-process communications between various RPH (500) subcomponents. One of ordinary skill will appreciate that the OS (510) may perform other functionalities without departing from the scope of the invention.

In one embodiment of the invention, the PSA (512) may represent a collection of one or more physical storage devices and/or media on which various forms of information—pertinent to operations performed by the restoration proxy (508)—may be consolidated. The one or more physical storage devices and/or media may or may not be of the same type. Further, the information consolidated in the PSA (512) may be arranged by way of any storage mechanism (e.g., a filesystem, a collection of tables or records, etc.). In one embodiment of the invention, the PSA (512) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, at least a portion of the PSA (512) may be allocated towards forming a data buffer (514). Specifically, the data buffer (514) may represent a logical partition of the PSA (512) used, by the restoration proxy (508), to temporarily store data (e.g., virtual machine state consolidated as backup virtual machine disks) while the data migrates from one place (i.e., the backup storage system (BSS) (not shown)) to another (i.e., a target VMH (544A-544N)) during virtual machine recovery operations. Further, the PSA (512) may also store primary connection information (PCI) (516) and host connection information (HCI) (518). PCI (516) may refer to information necessary to establish a connection with the CMS (542) and is described in further detail below with respect to FIG. 6A. HCI (518), on the other hand, may refer to information necessary to establish a connection with any given VMH (544A-544N) and is described in further detail below with respect to FIG. 6B.

Figure 6A:
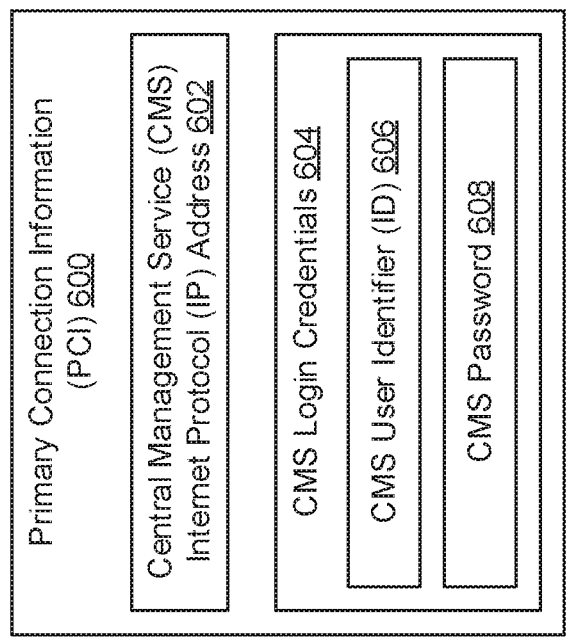
FIG. 6A shows primary connection information in accordance with one or more embodiments of the invention.

FIG. 6A shows primary connection information (PCI) in accordance with one or more embodiments of the invention. PCI (600) may represent information pertinent towards establishing a connection and interacting with the central management service (CMS) (see e.g., FIG. 1). Further, PCI (600) may include a CMS Internet Protocol (IP) address (602) and CMS login credentials (604). Each of these pieces of information is described below.

In one embodiment of the invention, the CMS IP address (602) may be an identification string assigned to the CMS in an IP-enabled network. The CMS IP address (602) not only identifies the CMS but also specifies a location of the CMS in the IP-enabled network. Presently, IP addresses conform to the IP version 4 (IPv4) addressing standard (e.g., "192.168.1.15/24") or the IP version 6 (IPv6) addressing standard (e.g., "2001:db8:0:1234:0:567:8:1").

In one embodiment of the invention, the CMS login credentials (604) may refer to authentication information required to access and/or interact with the CMS. The CMS login credentials (604) may include, but is not limited to, a CMS user identifier (ID) (606) and a corresponding CMS password (608). The CMS user ID (604) may be an alphanumeric string, assigned to the restoration proxy (see e.g., FIG. 5), which identifies the restoration proxy as a user of the CMS. The CMS password (608), on the other hand, may be a string of characters (e.g., letters, numbers, symbols, etc.), matched to the CMS user ID (606), which are necessary to authenticate the restoration proxy, thereby allowing the restoration proxy to connect with, gain access to, and interact with the CMS.

Figure 6B:
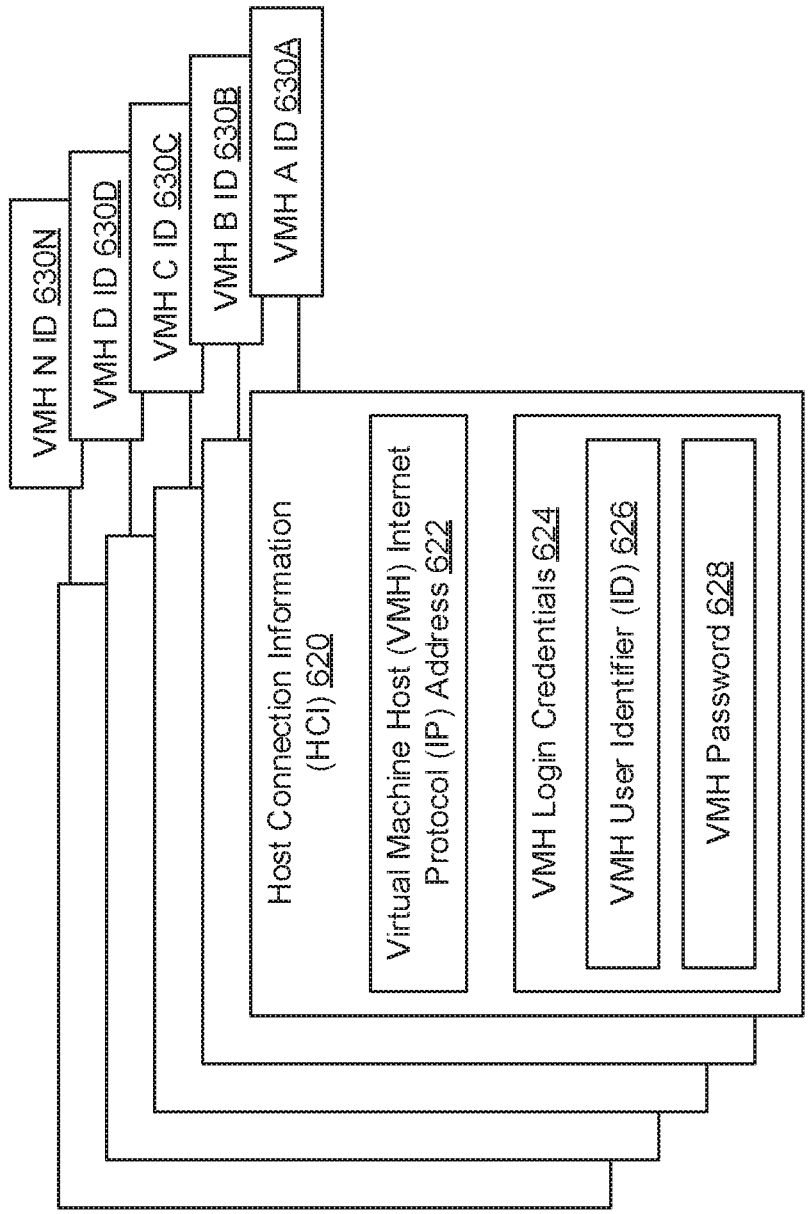
FIG. 6B shows host connection information in accordance with one or more embodiments of the invention.

FIG. 6B shows host connection information (HCI) in accordance with one or more embodiments of the invention. HCI (620) may represent information pertinent towards establishing a connection and interacting with a given virtual machine host (VMH) (see e.g., FIG. 1). Each HCI (620), respective to a given VMH, may be associated with a VMH ID (630A-630N) assigned to the given VMH. Further, HCI (620) may include a VMH Internet Protocol (IP) address (622) and VMH login credentials (624). Each of these pieces of information is described below.

In one embodiment of the invention, the VMH IP address (622) may be an identification string assigned to the VMH in an IP-enabled network. The VMH IP address (622) not only identifies the VMH but also specifies a location of the VMH in the IP-enabled network. Presently, IP addresses conform to the IP version 4 (IPv4) addressing standard (e.g., "192.168.1.15/24") or the IP version 6 (IPv6) addressing standard (e.g., "2001:db8:0:1234:0:567:8:1").

In one embodiment of the invention, the VMH login credentials (624) may refer to authentication information required to access and/or interact with the VMH. The VMH login credentials (624) may include, but is not limited to, a VMH user identifier (ID) (626) and a corresponding VMH password (628). The VMH user ID (624) may be an alphanumeric string, assigned to the restoration proxy (see e.g., FIG. 5), which identifies the restoration proxy as a user of the VMH. The VMH password (628), on the other hand, may be a string of characters (e.g., letters, numbers, symbols, etc.), matched to the VMH user ID (626), which are necessary to authenticate the restoration proxy thereby allowing the restoration proxy to connect with, gain access to, and interact with the VMH.

FIGS. 7A-7G show flowcharts describing a method for restoring a virtual machine in accordance with one or more embodiments of the invention. The various steps outlined below may be performed by a restoration proxy (see e.g., FIGS. 1 and 5). Further, while the various steps in the flowcharts are presented and described sequentially, one of ordinary skill will appreciate that some or all steps may be executed in different orders, may be combined or omitted, and some or all steps may be executed in parallel.

Figure 7A:
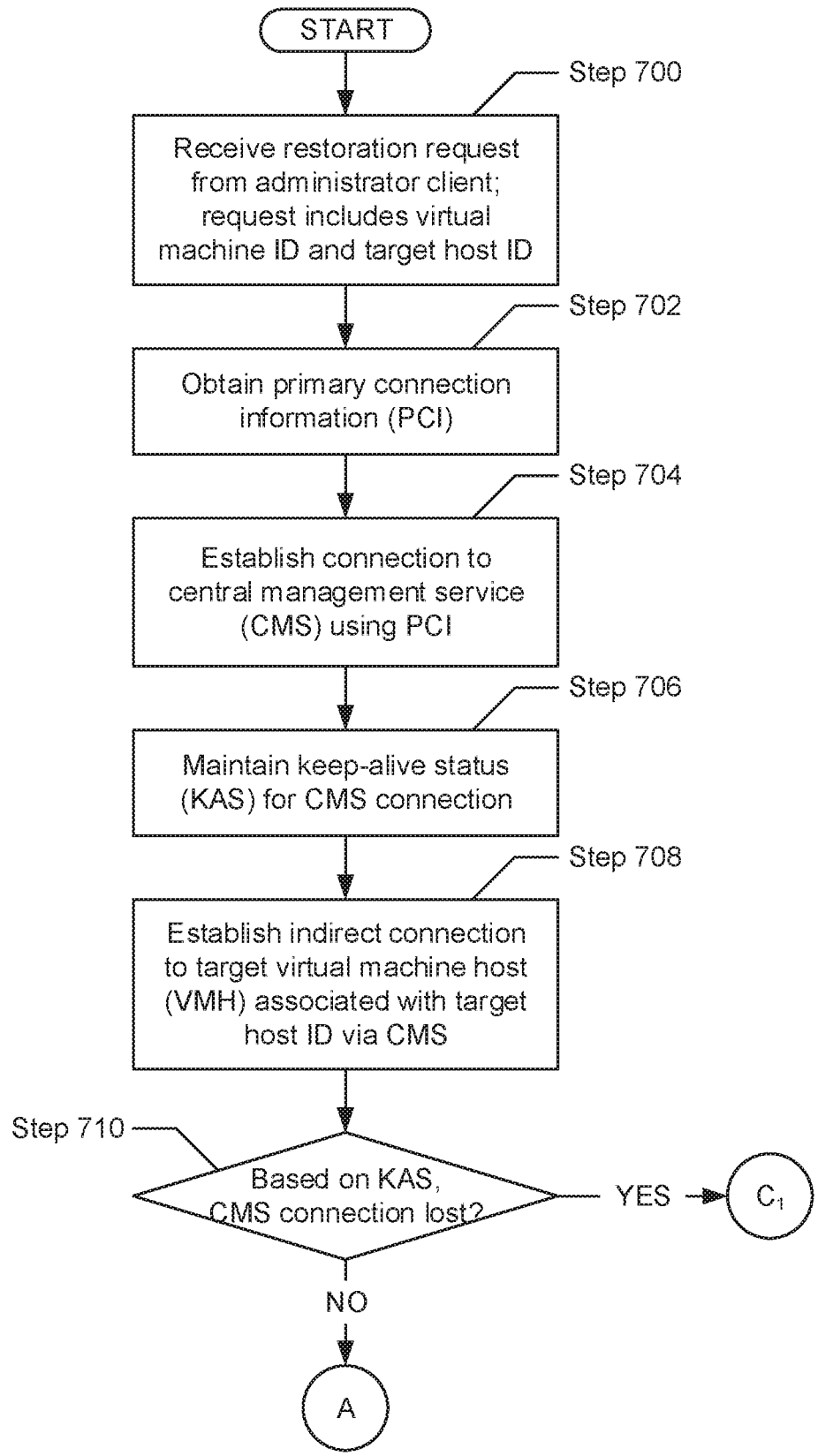

Turning to FIG. 7A, in Step 700, a restoration request is received from an administrator client (see e.g., FIG. 1). In one embodiment of the invention, the restoration request may be directed to recovering a virtual machine from a failed or malfunctioning state. Further, the restoration request may include a virtual machine identifier (ID) associated with a to-be-recovered virtual machine and a target host ID associated with a virtual machine host (VMH) (see e.g., FIG. 3) on which the to-be-recovered virtual machine is to be restored.

In Step 702, in response to the restoration request (received in Step 700), primary connection information (PCI) is obtained. In one embodiment of the invention, PCI may represent information pertinent towards establishing a connection and interacting with the central management service (CMS). Further, the PCI may include an Internet Protocol (IP) address associated with the CMS and appropriate login credentials required to interact with the CMS. Accordingly, in Step 704, using the PCI (obtained in Step 702), a connection to the CMS is established.

In Step 706, a keep-alive status (KAS) for the CMS connection (established in Step 704) is instantiated and maintained. In one embodiment of the invention, the KAS may be a data object that reflects the state of validity of the aforementioned CMS connection. That is, the KAS may serve as an indicator as to whether the CMS is still operational. Further, the KAS may be maintained based on the periodic issuance of transmission control protocol (TCP) keep-alive packets, which may be directed to the CMS through the CMS connection. To refrain from terminating the CMS connection, a response from the CMS, replying to the issuance of the keep-alive packets, is expected within a given time duration. If no response is received within the given time duration, the CMS is assumed to be inoperable, thereby leading to the termination of the CMS connection.

In Step 708, an indirect connection to a target VMH is established. Specifically, in one embodiment of the invention, a connection may be established with the target VMH through the CMS (with which the CMS connection had been established in Step 704). Further, the target VMH to which the indirect connection is established may be a VMH with which the target host ID (received in Step 700) is associated.

In Step 710, a determination is made as to whether the CMS connection (established in Step 704) is valid based on the KAS (maintained since Step 706). In one embodiment of the invention, if the KAS reflects that the CMS connection is still valid (i.e., the CMS is still operational and responsive), then the process may proceed to Step 716 (see e.g., FIG. 7B). On the other hand, in another embodiment of the invention, if the KAS reflects that the CMS connection has become invalid (i.e., the CMS is inoperable and/or unresponsive), then the process may alternatively proceed to Step 746 (see e.g., FIG. 7D).

Figure 7B:
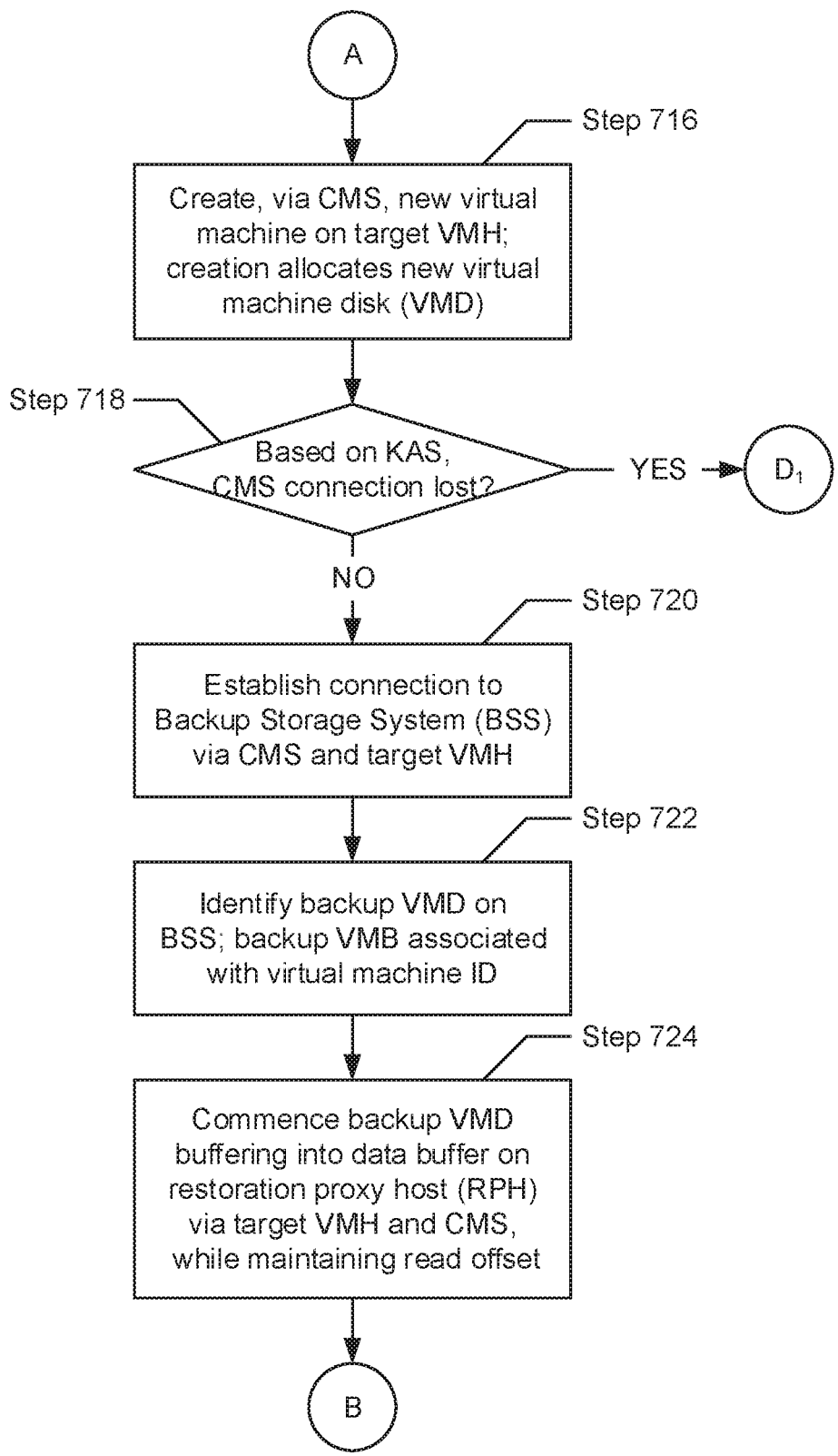

Turning to FIG. 7B, in Step 716, after determining (in Step 710) that the CMS connection is still valid, a new virtual machine is created on the target VMH (with which the indirect connection was established in Step 708). Specifically, in one embodiment of the invention, the CMS may be manipulated to issue instructions to a host management agent (HMA) (see e.g., FIG. 3) residing on the target VMH, where the instructions may direct the HMA to create the new virtual machine on the target VMH. Further, towards creating the new virtual machine, the HMA may also be directed to create a corresponding new virtual machine disk (VMD) within physical storage residing on the target VMH. The new VMD may be instantiated as a blank or unpopulated VMD; however, may represent a logical container in which the to-be-recovered virtual machine state, pertinent to the to-be-recovered virtual machine, is to be deposited.

In Step 718, a determination is made as to whether the CMS connection (established in Step 704) is valid based on the KAS (maintained since Step 706). In one embodiment of the invention, if the KAS reflects that the CMS connection is still valid (i.e., the CMS is still operational and responsive), then the process may proceed to Step 720. On the other hand, in another embodiment of the invention, if the KAS reflects that the CMS connection has become invalid (i.e., the CMS is inoperable and/or unresponsive), then the process may alternatively proceed to Step 756 (see e.g., FIG. 7E).

In Step 720, after determining (in Step 718) that the CMS connection is still valid, a connection to the backup storage system (BSS) (see e.g., FIG. 1) is established. Specifically, in one embodiment of the invention, the CMS may be further manipulated to instruct the above-mentioned HMA on the target VMH to connect to the BSS, with which the target VMH is operatively connected. Upon receipt of said instructions, the HMA may connect to the BSS through the BSS interface and/or operating system (OS) residing on the target VMH (see e.g., FIG. 3).

In Step 722, a backup VMD consolidated on the BSS is identified. In one embodiment of the invention, the backup VMD may represent a logical container, allocated within the physical storage of the BSS (see e.g., FIG. 4), wherein a copy of a given virtual machine state is stored. Further, the backup VMD and, thus, the given virtual machine state, may be associated with the virtual machine ID (received in Step 700), which pertains to the to-be-recovered virtual machine. The given virtual machine state encompasses data files, metadata, etc., necessary to restore the to-be-recovered virtual machine.

In Step 724, buffering of the backup VMD (identified in Step 722) is commenced. In one embodiment of the invention, buffering of the backup VMD may entail replicating the virtual machine state stored in the backup VMD, chunks or data blocks at a time, and forwarding these replicated data blocks (through the target VMH and the CMS) to a data buffer, which may reside on a restoration proxy host (RPH) (see e.g., FIG. 5). Further, the data buffer may serve as storage whereon the replicated data blocks may temporarily reside.

In one embodiment of the invention, each data block of virtual machine state may refer to a sequence of physically adjacent bytes, in the backup VMD, that retains some granularity of data (e.g., some granularity of the virtual machine state). Moreover, each data block may be associated with a respective data block offset, which may refer to a distance (or displacement), expressed as a byte count, between the beginning of the backup VMD and the beginning of the data block. That is, a data block offset may represent a position in the backup VMD where the respective data block is stored, where the position is relative to the start of the backup VMD. Accordingly, as each data block is buffered (i.e., replicated and stored in the data buffer), a read offset—representative of the data block offset associated with a next data block to be buffered (if any)—may be tracked.

Figure 7C:
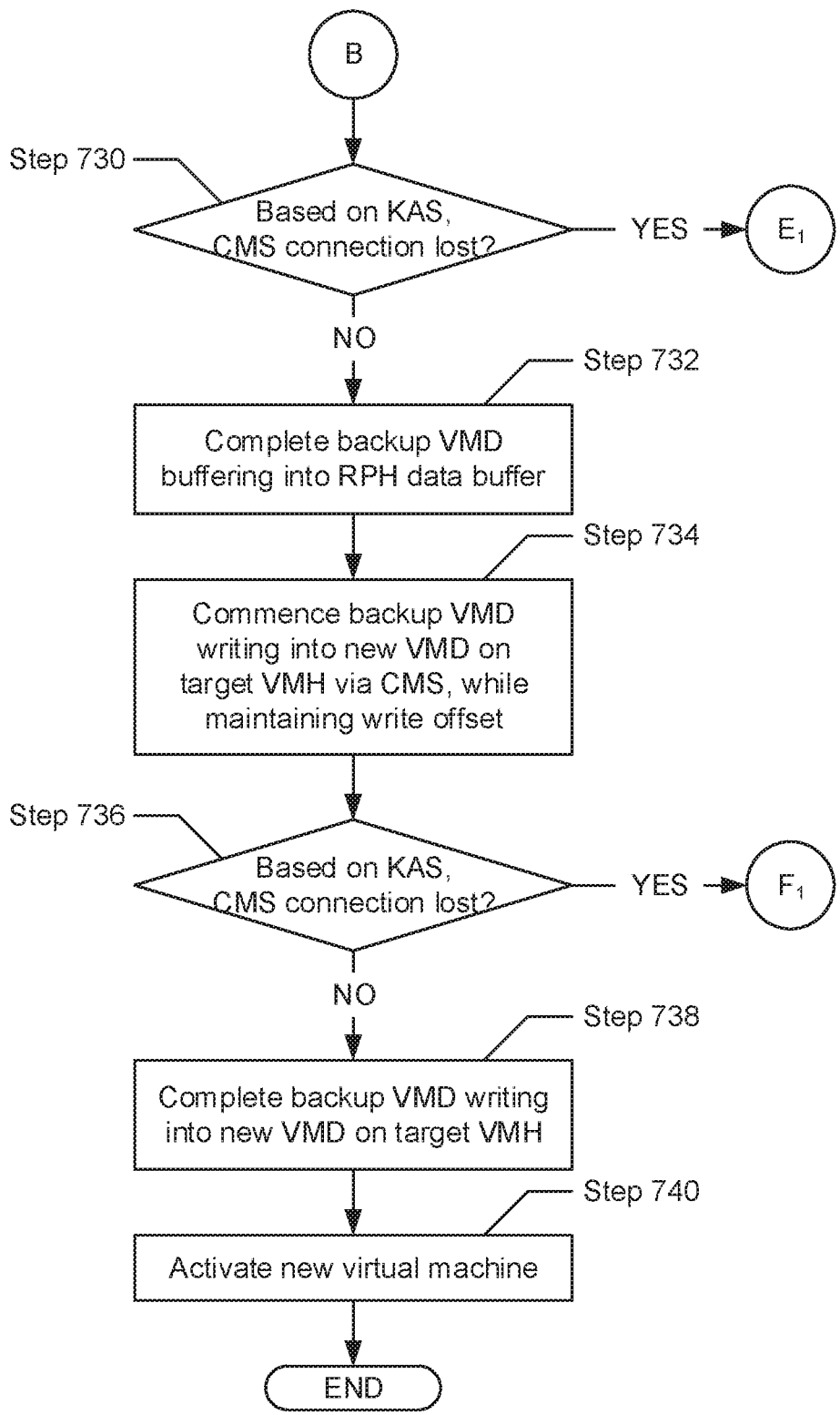

Turning to FIG. 7C, in Step 730, a determination is made as to whether the CMS connection (established in Step 704) is valid based on the KAS (maintained since Step 706). In one embodiment of the invention, if the KAS reflects that the CMS connection is still valid (i.e., the CMS is still operational and responsive), then the process may proceed to Step 732. On the other hand, in another embodiment of the invention, if the KAS reflects that the CMS connection has become invalid (i.e., the CMS is inoperable and/or unresponsive), then the process may alternatively proceed to Step 770 (see e.g., FIG. 7F).

In Step 732, after determining (in Step 730) that the CMS connection is still valid, the buffering of the backup VMD (commenced in Step 724) continues and, subsequently, is completed. That is, in one embodiment of the invention, the buffering completes when all data blocks, constituting the virtual machine state stored in the backup VMD, have been replicated and temporarily stored in the data buffer following their migration from the BSS to the RPH through the target VMH and the CMS. Thereafter, in Step 734, the writing of the replicated virtual machine state (stored in the data buffer) into the new VMD (created on the target VMH in Step 716) is commenced. In one embodiment of the invention, writing of the replicated virtual machine state may entail migrating the replicated virtual machine state, chunks or data blocks at a time, from the data buffer (residing on the RPH) to the new VMD (residing on the target VMH) along a path through the CMS. Further, as each data block is written into the new VMD, a write offset—representative of the data block offset associated with a next data block to be written (if any)—may be tracked.

In Step 736, a determination is made as to whether the CMS connection (established in Step 704) is valid based on the KAS (maintained since Step 706). In one embodiment of the invention, if the KAS reflects that the CMS connection is still valid (i.e., the CMS is still operational and responsive), then the process may proceed to Step 738. On the other hand, in another embodiment of the invention, if the KAS reflects that the CMS connection has become invalid (i.e., the CMS is inoperable and/or unresponsive), then the process may alternatively proceed to Step 782 (see e.g., FIG. 7G).

In Step 738, after determining (in Step 736) that the CMS connection is still valid, the writing of the replicated virtual machine state (commenced in Step 734) continues and, subsequently, is completed. That is, in one embodiment of the invention, the writing completes when all data blocks, constituting the replicated virtual machine state temporarily stored in the data buffer, have been moved from the RPH to the new VMD on the target VMH through the CMS. In Step 740, after populating the new VMD with the replicated virtual machine state, the new virtual machine (created in Step 716) is activated, thereby completing the virtual machine restoration process.

Turning to FIG. 7D, in Step 746, after determining (in Step 710) that the CMS connection (established in Step 704) has become invalid, host connection information (HCI) is obtained. In one embodiment of the invention, the selected HCI may be associated with the target host ID (received in Step 700). Further, the selected HCI may represent information pertinent towards establishing a connection and interacting with the target VMH directly (i.e., not indirectly through the CMS (which had occurred in Step 708)). Moreover, the selected HCI may include an IP address associated with the target VMH and appropriate login credentials required to interact with the target VMH. Accordingly, thereafter, in Step 748, using the selected HCI (obtained in Step 746), a direct connection to the target VMH is established.

In Step 750, a new virtual machine is created on the target VMH (with which the direction connection was established in Step 746). Specifically, in one embodiment of the invention, instructions may be issued to a host management agent (HMA) (see e.g., FIG. 3) residing on the target VMH, where the instructions may direct the HMA to create the new virtual machine on the target VMH. Further, towards creating the new virtual machine, the HMA may also be directed to create a corresponding new virtual machine disk (VMD) within physical storage residing on the target VMH. The new VMD may be instantiated as a blank or unpopulated VMD; however, may represent a logical container in which the to-be-recovered virtual machine state, pertinent to the to-be-recovered virtual machine, is to be deposited. Hereinafter, the process may proceed to Step 760 (see e.g., FIG. 7E).

Turning to FIG. 7E, in Step 756, after determining (in Step 718) that the CMS connection (established in Step 704) has become invalid, HCI is obtained. In one embodiment of the invention, the selected HCI may be associated with the target host ID (received in Step 700). Further, the selected HCI may represent information pertinent towards establishing a connection and interacting with the target VMH directly (i.e., not indirectly through the CMS (which had occurred in Step 708)). Moreover, the selected HCI may include an IP address associated with the target VMH and appropriate login credentials required to interact with the target VMH. Accordingly, thereafter, in Step 758, using the selected HCI (obtained in Step 756), a direct connection to the target VMH is established.

In Step 760, a connection to the backup storage system (BSS) (see e.g., FIG. 1) is established. Specifically, in one embodiment of the invention, instructions may be issued to the HMA on the target VMH to connect to the BSS, with which the target VMH is operatively connected. Upon receipt of said instructions, the HMA may connect to the BSS through the BSS interface and/or operating system (OS) residing on the target VMH (see e.g., FIG. 3).

In Step 762, a backup VMD consolidated on the BSS is identified. In one embodiment of the invention, the backup VMD may represent a logical container, allocated within the physical storage of the BSS (see e.g., FIG. 4), wherein a copy of a given virtual machine state is stored. Further, the backup VMD and, thus, the given virtual machine state, may be associated with the virtual machine ID (received in Step 700), which pertains to the to-be-recovered virtual machine. The given virtual machine state encompasses data files, metadata, etc., necessary to restore the to-be-recovered virtual machine.

In Step 764, buffering of the backup VMD (identified in Step 762) is commenced. In one embodiment of the invention, buffering of the backup VMD may entail replicating the virtual machine state stored in the backup VMD, chunks or data blocks at a time, and forwarding these replicated data blocks (through the target VMH) to a data buffer, which may reside on a restoration proxy host (RPH) (see e.g., FIG. 5). Further, the data buffer may serve as storage whereon the replicated data blocks may temporarily reside.

In one embodiment of the invention, each data block of virtual machine state may refer to a sequence of physically adjacent bytes, in the backup VMD, that retains some granularity of data (e.g., some granularity of the virtual machine state). Moreover, each data block may be associated with a respective data block offset, which may refer to a distance (or displacement), expressed as a byte count, between the beginning of the backup VMD and the beginning of the data block. That is, a data block offset may represent a position in the backup VMD where the respective data block is stored, where the position is relative to the start of the backup VMD. Accordingly, as each data block is buffered (i.e., replicated and stored in the data buffer), a read offset—representative of the data block offset associated with a next data block to be buffered (if any)—may be tracked. Hereinafter, the process may proceed to Step 774 (see e.g., FIG. 7F).

Turning to FIG. 7F, in Step 770, after determining (in Step 730) that the CMS connection (established in Step 704) has become invalid, HCI is obtained. In one embodiment of the invention, the selected HCI may be associated with the target host ID (received in Step 700). Further, the selected HCI may represent information pertinent towards establishing a connection and interacting with the target VMH directly (i.e., not indirectly through the CMS (which had occurred in Step 708)). Moreover, the selected HCI may include an IP address associated with the target VMH and appropriate login credentials required to interact with the target VMH. Accordingly, thereafter, in Step 772, using the selected HCI (obtained in Step 770), a direct connection to the target VMH is established.

In Step 774, the buffering of the backup VMD (commenced in Step 724, however, interrupted due to the invalidity of the CMS connection determined in Step 730)

continues and, subsequently, is completed. That is, in one embodiment of the invention, the interrupted buffering of the backup VMD may resume at the read offset that had been tracking the progression of the buffering operation. In maintaining the read offset, the buffering of the backup VMD may not need to be restarted from the beginning of the backup VMD, but rather resumed from the position of the next data block of virtual machine state to be buffered (indicated by the read offset). Subsequently, buffering of the backup VMD completes when all data blocks, constituting the virtual machine state stored in the backup VMD, have been replicated and temporarily stored in the data buffer following their migration from the BSS to the RPH through the target VMH.

In Step 776, the writing of the replicated virtual machine state (stored in the data buffer) into the new VMD (created on the target VMH in Step 716) is commenced. In one embodiment of the invention, writing of the replicated virtual machine state may entail migrating the replicated virtual machine state, chunks or data blocks at a time, from the data buffer (residing on the RPH) to the new VMD (residing on the target VMH) without going through the CMS. Further, as each data block is written into the new VMD, a write offset—representative of the data block offset associated with a next data block to be written (if any)—may be tracked. Hereinafter, the process may proceed to Step 786 (see e.g., FIG. 7G).

Turning to FIG. 7G, in Step 782, after determining (in Step 736) that the CMS connection (established in Step 704) has become invalid, HCI is obtained. In one embodiment of the invention, the selected HCI may be associated with the target host ID (received in Step 700). Further, the selected HCI may represent information pertinent towards establishing a connection and interacting with the target VMH directly (i.e., not indirectly through the CMS (which had occurred in Step 708)). Moreover, the selected HCI may include an IP address associated with the target VMH and appropriate login credentials required to interact with the target VMH. Accordingly, thereafter, in Step 784, using the selected HCI (obtained in Step 782), a direct connection to the target VMH is established.

In Step 786, the writing of the replicated virtual machine state (commenced in Step 734, however, interrupted due to the invalidity of the CMS connection determined in Step 736) continues and, subsequently, is completed. That is, in one embodiment of the invention, the interrupted writing of the replicated virtual machine state may resume at the write offset that had been tracking the progression of the writing operation. In maintaining the write offset, the writing of the replicated virtual machine state may not need to be restarted from the beginning, but rather resumed from the position of the next data block of virtual machine state to be written (indicated by the write offset). Subsequently, writing of the replicated virtual machine state completes when all data blocks, constituting the virtual machine state temporarily stored in the data buffer, have been moved from the RPH to the new VMD on the target VMH. In Step 788, after populating the new VMD with the replicated virtual machine state, the new virtual machine (created in Step 716) is activated, thereby completing the virtual machine restoration process.

Figure 8:
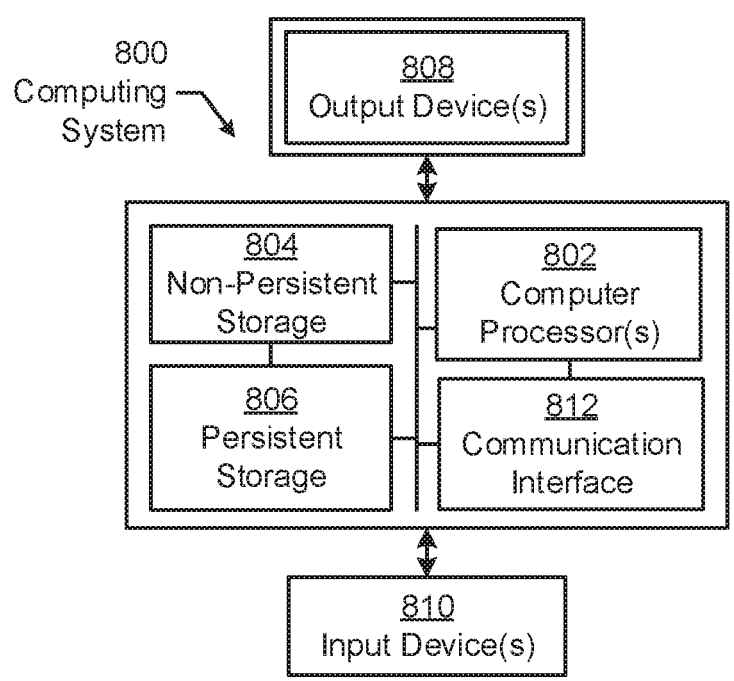
FIG. 8 shows a computing system in accordance with one or more embodiments of the invention.

FIG. 8 shows a computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for restoring virtual machines, comprising:
receiving, from an administrator client, a restoration request comprising a virtual machine identifier (ID) and a target host ID;
in response to receiving the restoration request:
obtaining primary connection information (PCI);
establishing a first connection to a central management service (CMS) using the PCI;
maintaining a keep-alive status (KAS) describing a validity state of the first connection; and
restoring a virtual machine associated with the virtual machine ID, on a target virtual machine host (VMH) associated with the target host ID, based on the KAS, wherein restoring the virtual machine based on the KAS comprises:

establishing a second connection to the target VMH, wherein the second connection is an indirect connection established through the CMS;

making a determination, based on the KAS, that the first connection has become invalid, wherein the second connection is unusable in response to the first connection becoming invalid;

establishing a third connection to the target VMH using host connection information (HCI), wherein the third connection is a direct connection that bypasses the CMS; and establishing a fourth connection to a backup storage system (BSS), wherein the fourth connection is an indirect connection established through the target VMH.

2. The method of claim 1, wherein the PCI comprises an Internet Protocol (IP) address associated with the CMS and login credentials required to interact with the CMS.

3. The method of claim 1, wherein restoring the virtual machine based on the KAS further comprises:

based on the determination:
obtaining the HCI associated with the target host ID;
instructing the target VMH to create a new virtual machine and a new virtual machine disk (VMD) thereon, wherein the new virtual machine is to replace the virtual machine associated with the virtual machine ID;
identifying, on the BSS, a backup VMD associated with the virtual machine ID;
buffering, into a data buffer, virtual machine state stored in the backup VMD, wherein the virtual machine state travels through the target VMH to arrive at the data buffer;
writing, after the buffering completes, the virtual machine state from the data buffer and into the new VMD; and
activating, after the writing completes, the new virtual machine to restore the virtual machine.

4. The method of claim 3, wherein the HCI comprises an Internet Protocol (IP) address associated with the target VMH and login credentials required to interact with the target VMH.

5. The method of claim 1, wherein restoring the virtual machine based on the KAS further comprises:

instructing the target VMH to create a new virtual machine and a new virtual machine disk (VMD) thereon, wherein the new virtual machine is to replace the virtual machine associated with the virtual machine ID;

based on the determination:
obtaining host connection information (HCI) associated with the target host ID;
identifying, on the BSS, a backup VMD associated with the virtual machine ID;
buffering, into a data buffer, virtual machine state stored in the backup VMD, wherein the virtual machine state travels through the target VMH to arrive at the data buffer;
writing, after the buffering completes, the virtual machine state from the data buffer and into the new VMD; and
activating, after the writing completes, the new virtual machine to restore the virtual machine.

6. The method of claim 1, wherein restoring the virtual machine based on the KAS, comprises:

instructing the target VMH to create a new virtual machine and a new virtual machine disk (VMD) thereon, wherein the new virtual machine is to replace the virtual machine associated with the virtual machine ID;
identifying, on the BSS, a backup VMD associated with the virtual machine ID;
buffering, into a data buffer, virtual machine state stored in the backup VMD while tracking a read offset, wherein the virtual machine state travels through the target VMH and the CMS to arrive at the data buffer, wherein the determination is made while still buffering the virtual machine state;
based on the determination:
obtaining host connection information (HCI) associated with the target host ID;
resuming, into the data buffer, the buffering of the virtual machine state from the read offset, wherein the virtual machine state travels through the target VMH to arrive at the data buffer;
writing, after the buffering completes, the virtual machine state from the data buffer and into the new VMD; and
activating, after the writing completes, the new virtual machine to restore the virtual machine.

7. The method of claim 1, wherein restoring the virtual machine based on the KAS further comprises:

instructing the target VMH to create a new virtual machine and a new virtual machine disk (VMD) thereon, wherein the new virtual machine is to replace the virtual machine associated with the virtual machine ID;
identifying, on the BSS, a backup VMD associated with the virtual machine ID;
buffering, into a data buffer, virtual machine state stored in the backup VMD, wherein the virtual machine state travels through the target VMH and the CMS to arrive at the data buffer;
writing, after the buffering completes, the virtual machine state from the data buffer and into the new VMD while tracking a write offset, wherein the virtual machine state travels through the CMS to arrive at the new VMD on the target VMH, wherein the determination is made while still writing the virtual machine state;
based on the determination:
obtaining host connection information (HCI) associated with the target host ID;
resuming, into the new VMD, the writing of the virtual machine state from the write offset; and
activating, after the writing completes, the new virtual machine to restore the virtual machine.

8. A system, comprising:
an administrator client;
a computer processor operatively connected to the administrator client;
a central management service (CMS) and a plurality of virtual machine hosts (VMHs) operatively connected to one another and the computer processor; and
a restoration proxy executing on the computer processor, wherein the restoration proxy is programmed to:
receive, from the administrator client, a restoration request comprising a virtual machine identifier (ID) and a target host ID;
in response to receiving the restoration request:
obtain primary connection information (PCI);
establish a first connection to the CMS using the PCI;
maintain a keep-alive status (KAS) describing a validity state of the first connection; and restore a virtual machine associated with the virtual machine ID, on a target VMH, of the plurality of VMHs, associated with the target host ID, based on the KAS, wherein restoring the virtual machine based on the KAS comprises:
    establishing a second connection to the target VMH, wherein the second connection is an indirect connection established through the CMS;
    making a determination, based on the KAS, that the first connection has become invalid, wherein the second connection is unusable in response to the first connection becoming invalid;
    establishing a third connection to the target VMH using host connection information (HCI), wherein the third connection is a direct connection that bypasses the CMS; and
    establishing a fourth connection to a backup storage system (BSS), wherein the fourth connection is an indirect connection established through the target VMH.

9. The system of claim 8, wherein a VMH of the plurality of VMHs comprises the computer processor, wherein the VMH is not the target VMH.

10. The system of claim 8, further comprising:
    a restoration proxy host (RPH) comprising the computer processor, and operatively connected to the administrator client, the CMS, and the plurality of VMHs.

11. The system of claim 8, further comprising:
    a backup storage system (BSS) operatively connected to the plurality of VMHs.

12. A non-transitory computer readable medium (CRM) comprising computer readable program code, which when executed by a computer processor, enables the computer processor to:
    receive, from an administrator client, a restoration request comprising a virtual machine identifier (ID) and a target host ID;
    in response to receiving the restoration request:
        obtain primary connection information (PCI);
        establish a first connection to a central management service (CMS) using the PCI;
        maintain a keep-alive status (KAS) describing a validity state of the first connection; and
        restore a virtual machine associated with the virtual machine ID, on a target virtual machine host (VMH) associated with the target host ID, based on the KAS, wherein restoring the virtual machine based on the KAS comprises:
            establishing a second connection to the target VMH, wherein the second connection is an indirect connection established through the CMS;
            making a determination, based on the KAS, that the first connection has become invalid, wherein the second connection is unusable in response to the first connection becoming invalid;
            establishing a third connection to the target VMH using host connection information (HCI), wherein the third connection is a direct connection that bypasses the CMS; and
            establishing a fourth connection to a backup storage system (BSS), wherein the fourth connection is an indirect connection established through the target VMH.

13. The non-transitory CRM of claim 12, wherein the PCI comprises an Internet Protocol (IP) address associated with the CMS and login credentials required to interact with the CMS.

14. The non-transitory CRM of claim 12, wherein restoring the virtual machine based on the KAS further comprises:
    based on the determination:
        obtaining the HCI associated with the target host ID;
        instructing the target VMH to create a new virtual machine and a new virtual machine disk (VMD) thereon, wherein the new virtual machine is to replace the virtual machine associated with the virtual machine ID;
        identifying, on the BSS, a backup VMD associated with the virtual machine ID;
        buffering, into a data buffer, virtual machine state stored in the backup VMD, wherein the virtual machine state travels through the target VMH to arrive at the data buffer;
        writing, after the buffering completes, the virtual machine state from the data buffer and into the new VMD; and
        activating, after the writing completes, the new virtual machine to restore the virtual machine.

15. The non-transitory CRM of claim 14, wherein the HCI comprises an Internet Protocol (IP) address associated with the target VMH and login credentials required to interact with the target VMH.

16. The non-transitory CRM of claim 12, wherein restoring the virtual machine based on the KAS further comprises:
    instructing the target VMH to create a new virtual machine and a new virtual machine disk (VMD) thereon, wherein the new virtual machine is to replace the virtual machine associated with the virtual machine ID;
    based on the determination:
        obtaining the HCI associated with the target host ID;
        identifying, on the BSS, a backup VMD associated with the virtual machine ID;
        buffering, into a data buffer, virtual machine state stored in the backup VMD, wherein the virtual machine state travels through the target VMH to arrive at the data buffer;
        writing, after the buffering completes, the virtual machine state from the data buffer and into the new VMD; and
        activating, after the writing completes, the new virtual machine to restore the virtual machine.

17. The non-transitory CRM of claim 12, wherein restoring the virtual machine based on the KAS further comprises:
    instructing the target VMH to create a new virtual machine and a new virtual machine disk (VMD) thereon, wherein the new virtual machine is to replace the virtual machine associated with the virtual machine ID;
    identifying, on the BSS, a backup VMD associated with the virtual machine ID;
    buffering, into a data buffer, virtual machine state stored in the backup VMD while tracking a read offset, wherein the virtual machine state travels through the target VMH and the CMS to arrive at the data buffer, wherein the determination is made while still buffering the virtual machine state;
    based on the determination:
        obtaining the HCI associated with the target host ID;
        resuming, into the data buffer, the buffering of the virtual machine state from the read offset, wherein the virtual machine state travels through the target VMH to arrive at the data buffer;

writing, after the buffering completes, the virtual machine state from the data buffer and into the new VMD; and activating, after the writing completes, the new virtual machine to restore the virtual machine.

18. The non-transitory CRM of claim 12, wherein restoring the virtual machine based on the KAS further comprises:

instructing the target VMH to create a new virtual machine and a new virtual machine disk (VMD) thereon, wherein the new virtual machine is to replace the virtual machine associated with the virtual machine ID;

identifying, on the BSS, a backup VMD associated with the virtual machine ID;

buffering, into a data buffer, virtual machine state stored in the backup VMD, wherein the virtual machine state travels through the target VMH and the CMS to arrive at the data buffer;

writing, after the buffering completes, the virtual machine state from the data buffer and into the new VMD while tracking a write offset, wherein the virtual machine state travels through the CMS to arrive at the new VMD on the target VMH, wherein the determination is made while still writing the virtual machine state;

based on the determination:

obtaining the HCI associated with the target host ID;

resuming, into the new VMD, the writing of the virtual machine state from the write offset; and activating, after the writing completes, the new virtual machine to restore the virtual machine.

* * * * *